United States Patent
Wu (10) Patent No.: US 9,736,620 B2
(45) Date of Patent: Aug. 15, 2017

(54) METHOD, SYSTEM AND DEVICE FOR MACHINE TYPE COMMUNICATION IN LTE-A

(71) Applicants: ZTE Corporation, Shenzhen, Guangdong (CN); Sanechips Technology Co., Ltd., Nanshan District, Shenzhen, Guangdong (CN)

(72) Inventor: Gang Wu, Shenzhen (CN)

(73) Assignees: ZTE Corporation, Shenzhen, Guangdong (CN); Sanechips Technology Co., Ltd., Shenzhen, Guangdong (CN)

( * ) Notice: Subject to any disclaimer, the term of this patent is extended or adjusted under 35 U.S.C. 154(b) by 51 days.

(21) Appl. No.: 14/439,932

(22) PCT Filed: Sep. 23, 2013

(86) PCT No.: PCT/CN2013/084027
§ 371 (c)(1),
(2) Date: Apr. 30, 2015

(87) PCT Pub. No.: WO2014/067369
PCT Pub. Date: May 8, 2014

(65) Prior Publication Data
US 2015/0289080 A1    Oct. 8, 2015

(30) Foreign Application Priority Data

Oct. 31, 2012 (CN) .......................... 2012 1 0428068

(51) Int. Cl.
*H04W 4/00*    (2009.01)
*H04W 76/02*    (2009.01)
(Continued)

(52) U.S. Cl.
CPC ........... *H04W 4/005* (2013.01); *H04W 16/14* (2013.01); *H04W 72/0413* (2013.01);
(Continued)

(58) Field of Classification Search
CPC ... H04W 76/02; H04W 4/005; H04W 76/023; H04W 72/0446; H04W 72/0413;
(Continued)

(56) References Cited

U.S. PATENT DOCUMENTS

2010/0195579 A1 * 8/2010 Park .................... H04W 74/006
                                                                        370/329
2011/0159802 A1    6/2011 Binti Harum
(Continued)

FOREIGN PATENT DOCUMENTS

CN    101730123 A    6/2010
CN    102158901 A    8/2011
(Continued)

OTHER PUBLICATIONS

International Search Report in international application No. PCT/CN2013/084027, mailed on Dec. 26, 2013.
(Continued)

*Primary Examiner* — Jae Y Lee
(74) *Attorney, Agent, or Firm* — Oppedahl Patent Law Firm LLC (57) ABSTRACT

Provided is a method for MTC in LTE-A. The method includes that pieces of MTC UE are divided into at least one cluster unit, each of which includes one piece of second UE as a cluster head and at least one piece of first UE as cluster members, wherein the first UE sends data information to the second UE through a PUSCH; after receiving the data information, the second UE forwards the data information to an eNB; after receiving the data information, the eNB sends DTG information to the first UE so as to complete data (Continued)

information transmission. In the meanwhile, a system and device for MTC communication in LTE-A are provided. Accordingly, the utilization rate of resources is improved when there are limited frequency spectrum resources, the burden of a base station is reduced and interference on uses around is reduced.

19 Claims, 2 Drawing Sheets

(51) Int. Cl.
*H04W 16/14* (2009.01)
*H04W 72/04* (2009.01)
*H04W 76/04* (2009.01)
*H04W 88/04* (2009.01)
*H04W 88/02* (2009.01)
*H04W 88/08* (2009.01)

(52) U.S. Cl.
CPC ....... *H04W 72/0446* (2013.01); *H04W 76/02* (2013.01); *H04W 76/023* (2013.01); *H04W 76/046* (2013.01); *H04W 88/02* (2013.01); *H04W 88/04* (2013.01); *H04W 88/08* (2013.01)

(58) Field of Classification Search
CPC ... H04W 16/14; H04W 76/046; H04W 88/04; H04W 88/02; H04W 88/08
See application file for complete search history.

(56) References Cited

U.S. PATENT DOCUMENTS

| | | |
|---|---|---|
| 2012/0296968 A1 | 11/2012 | Lin |
| 2013/0028184 A1 | 1/2013 | Lee et al. |
| 2013/0039262 A1 | 2/2013 | Lim et al. |
| 2013/0044623 A1* | 2/2013 | Speight .............. H04B 7/15528 370/252 |
| 2014/0092833 A1* | 4/2014 | Vannithamby .... H04W 52/0258 370/329 |

FOREIGN PATENT DOCUMENTS

| | | |
|---|---|---|
| CN | 102164425 A | 8/2011 |
| WO | 2011083997 A2 | 7/2011 |
| WO | 2011136524 A2 | 11/2011 |
| WO | 2012106619 A1 | 8/2012 |

OTHER PUBLICATIONS

English Translation of the Written Opinion of the International Search Authority in international application No. PCT/CN2013/084027, mailed on Dec. 26, 2013.

Supplementary European Search Report in European application No. 13851126.6, mailed on Nov. 26, 2015.

Transparent Relay for LTE-Advanced FDD, mailed on Jun. 25, 2008.

* cited by examiner

METHOD, SYSTEM AND DEVICE FOR MACHINE TYPE COMMUNICATION IN LTE-A

TECHNICAL FIELD

The disclosure relates to a Machine Type Communication (MTC) technology in the field of wireless communications, particularly to a method, system and device for MTC in Long Term Evolution Advanced (LTE-A).

BACKGROUND

MTC refers to transferring information through communication networks so as to implement machine-to-machine data transmission. That is, interconnection and interworking between machines are implemented through the communication networks. A mobile communication network, which is able to provide mobility support without a necessity of setting up a network at a terminal side manually, is beneficial for saving cost and is able to satisfy communication requirements in a dangerous environment, thus an MTC service carried on the mobile communication network has gained wide attention. A mobile operator needs to improve the operating efficiency as much as possible when there are limited frequency spectrum resources and to control the number of Radio Access Technology (RAT) devices effectively in order to reduce the operating cost of the whole network. Nevertheless, MTC has a market that keeps growing rapidly, which means the number of terminals will increase.

In the prior art, a base station needs to implement data transmission with each User Equipment (UE), and the burden of the base station will become increasingly heavy when the number of terminals is increased.

SUMMARY

In view of this, embodiments of the disclosure provide a method, system and device for MTC in LTE-A so as to improve the utilization rate of resources when there are limited frequency spectrum resources and to reduce the burden of a base station.

To achieve the purpose, technical solutions of the embodiments of the disclosure is implemented by the following way.

An embodiment of the disclosure provides a method for MTC in LTE-A. The method includes that pieces of MTC UE are divided into at least one cluster unit, each cluster unit includes one piece of second UE serving as a cluster head and at least one piece of first UE serving as cluster members, wherein the first UE sends data information to the second UE through a Physical Uplink Shared Channel (PUSCH); after receiving the data information, the second UE forwards the data information to an Evolved Node B (eNB); the eNB sends Data Transmission Grant (DTG) information to the first UE after receiving the data information to complete data information transmission.

Preferably, before the first UE sends the data information to the second UE through the PUSCH, the method may further include that:

the second UE forwards, to the eNB, Radio Resource Control (RRC) connection request information sent by the first UE to request for establishment of a network connection; the eNB sends RRC connection establishment information to the first UE; the first UE forwards RRC connection establishment completion information to the eNB through the second UE to complete the establishment of the network connection.

Preferably, before the second UE forwards to the eNB, the RRC connection request information sent by the first UE to request for the establishment of the network connection, the method may further include that:

the second UE forwards to the eNB a Random Access Preamble (RAP) signal sent by the first UE, so as to request for network access; the eNB sends a Random Access Response (RAR) signal to the first UE; the second UE forwards, to the eNB, message signals of a Data Link Layer (DLL) and a Network Layer (NL) from the first UE; and the eNB sends a competition parsing message to the first UE to complete the network access.

Preferably, the method may further include that the eNB sends sub-frame resource configuration information to the second UE and the first UE through the RRC connection establishment information, wherein the sub-frame resource configuration information includes sub-frame resource configuration information of a time domain and sub-frame resource configuration information of a frequency domain.

Preferably, the method may further include that the sub-frame resource configuration information of the time domain is sent to the second UE and the first UE by the eNB directly through SubframeConfig signaling in the RRC connection establishment information; and the sub-frame resource configuration information of the frequency domain is sent to the second UE and the first UE by the eNB through Uplink Control Information (UCI) in a Physical Uplink Control Channel (PUCCH) in an uplink direction, and is sent to the second UE and the first UE by the eNB through Downlink Control Information (DCI) in a Physical Downlink Control Channel (PDCCH) in a downlink direction.

An embodiment of the disclosure further provides a cluster unit for MCT in LTE-A. The cluster unit includes one piece of second UE and at least one piece of first UE, wherein the second UE may be configured to forward, to an eNB, data information sent by a first UE; and the first UE may be configured to send the data information to the second UE through a PUSCH, and is further configured to receive DTG information sent by the eNB to complete data information transmission.

Preferably, the second UE may be configured to forward to the eNB RRC connection request information sent by the first UE, and is further configured to forward to the eNB RRC connection establishment completion information sent by the first UE to complete establishment of a network connection; and the first UE may be configured to send the RRC connection request information to the second UE to request for the establishment of the network connection, and may be further configured to send the RRC connection establishment completion information to the second UE after receiving RRC connection establishment information sent by the eNB.

Preferably, the second UE may be configured to forward to the eNB an RAP signal sent by the first UE, and may be further configured to forward to the eNB message signals of a DLL and an NL from the first UE; and the first UE may be configured to send the RAP signal to the second UE to request for network access and receive an RAR signal sent by the eNB, and may be further configured to send the message signals of the DLL and the NL to the second UE, and receive a competition parsing message sent by the eNB to complete the network access.

An embodiment of the disclosure further provides a system for MTC in LTE-A. The system includes an eNB and at least one cluster unit; each cluster unit includes one piece of second UE serving as a cluster head and at least one piece of first UE serving as cluster members, wherein the eNB may be configured to send DTG information to the first UE after receiving data information from the second UE in the cluster unit, so as to complete data information transmission; and the cluster unit may be configured to forward the data information sent by the first UE to the eNB through the second UE.

Preferably, the eNB may be configured to send RRC connection establishment information to the first UE in the cluster unit after receiving RRC connection request information from the second UE in the cluster unit, and may be further configured to receive RRC connection establishment completion information from the second UE in the cluster unit so as to complete establishment of a network connection; and the cluster unit may be configured to send through the second UE the RRC connection request information to the eNB so as to request for the establishment of the network connection, and may be further configured to forward through the second UE the RRC connection establishment completion information sent by the first UE to the eNB after receiving the RRC connection establishment information from the eNB.

Preferably, the eNB may be further configured to send an RAR signal to the first UE in the cluster unit after receiving a RAP signal from the second UE in the cluster unit, and may be further configured to send a competition parsing message to the first UE in the cluster unit after receiving message signals of a DLL and an NL from the second UE in the cluster unit, so as to complete network access; and the cluster unit may be further configured to forward through the second UE the RAP signal sent by the first UE to the eNB, so as to request for the network access, and may be further configured to forward to the eNB through the second UE the message signals of the DLL and the NL sent by the first UE.

Preferably, the second UE may be configured to forward to the eNB the data information sent by the first UE; and the first UE may be configured to send the data information to the second UE through a PUSCH, and may be further configured to receive the DTG information from the eNB so as to complete the data information transmission.

Preferably, the second UE may be configured to forward to the eNB the RRC connection request information sent by the first UE, and may be further configured to forward to the eNB the RRC connection establishment completion information sent by the first UE so as to complete the establishment of the network connection; and the first UE may be configured to send the RRC connection request information to the second UE to request for the establishment of the network connection, and may be further configured to send the RRC connection establishment completion information to the second UE after receiving the RRC connection establishment information sent by the eNB.

Preferably, the second UE may be configured to forward to the eNB the RAP signal sent by the first UE, and may be further configured to forward to the eNB the message signals of the DLL and the NL from the first UE; and the first UE may be configured to send the RAP signal to the second UE to request for the network access and receive the RAR signal sent by the eNB, and may be further configured to send the second UE the message signals of DLL and NL sent by the second UE and to receive the competition parsing message sent by the eNB so as to complete the network access.

Preferably, the eNB may be further configured to send sub-frame resource configuration information to the cluster unit through the RRC connection establishment information, wherein the sub-frame resource configuration information includes sub-frame resource configuration information of a time domain and sub-frame resource configuration information of a frequency domain.

Preferably, the sub-frame resource configuration information of the time domain may be sent to the second UE and the first UE in the cluster unit by the eNB directly through SubframeConfig signaling in the RRC connection establishment information;

the sub-frame resource configuration information of the frequency domain may be sent to the second UE and the first UE in the cluster unit by the eNB through UCI in a PUCCH in an uplink direction, and may be sent to the second UE and the first UE in the cluster unit by the eNB through DCI in a PDCCH in a downlink direction.

The method, system and device for MTC in LTE-A according to the embodiments of the disclosure divide pieces of MTC UE into at least one cluster unit, each of which includes one piece of second UE serving as a cluster head and at least one piece of first UE serving as cluster members; the first UE sends data information to the second UE through a PUSCH; after receiving the data information, the second UE forwards the data information to an eNB; after receiving the data information, the eNB sends DTG information to the first UE so as to complete data information transmission. It can be seen that the data information sent by the first UE to the eNB is forwarded by the second UE having a relay function in an uplink direction according to the embodiments of the disclosure, thus improving the utilization rate of resources when frequency spectrum resources are limited and reducing the burden of a base station. In addition, the number of pieced of first UE is far larger than that of second UE in each cluster unit. In uplink transmission, a cluster member can have short-distance communication with a cluster head, which means that the range of the base station is extended to some degree. Besides, first UE, which is designed to have the minimalist functions of existing MTC UE, has small transmission power, thus reducing interference to users around.

DETAILED DESCRIPTION

The disclosure will be further expounded below in combination with the accompanying drawings and specific embodiments.

Figure 1:
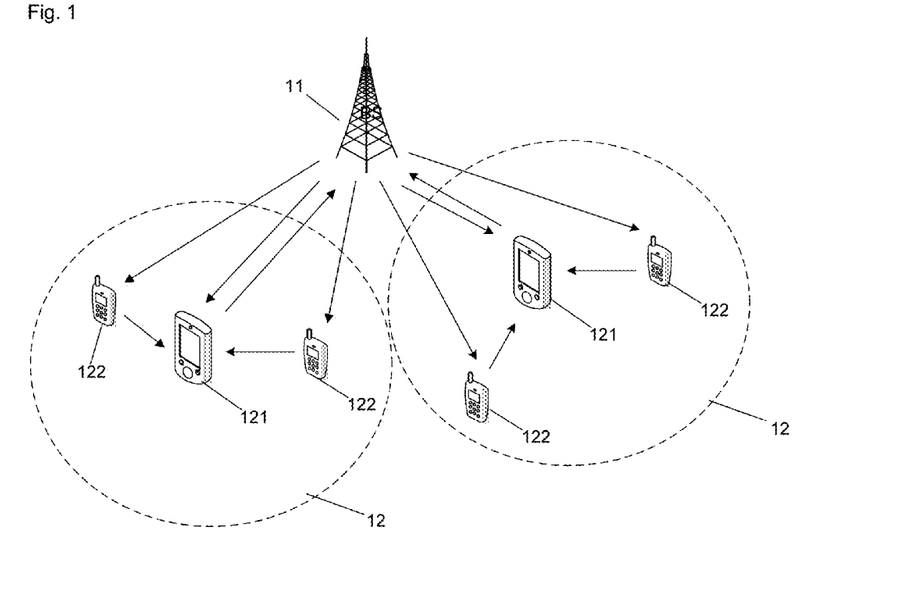
FIG. 1 is a schematic diagram of a composition architecture of a system for MTC in LTE-A according to an embodiment of the disclosure.

FIG. 1 is a schematic diagram of a composition architecture of a system supporting MTC in LTE-A according to an embodiment of the disclosure. As shown in FIG. 1, the system includes an eNB 11 and cluster units 12, each of the cluster units 12 includes one piece of second UE serving as a cluster head and at least one piece of first UE serving as cluster members, wherein the eNB 11 is configured to, after receiving data information from a cluster unit 12, send DTG information to the first UE which sends the data information in the cluster unit 12 so as to complete data information transmission; and the cluster unit 12 is configured to send through the second UE the data information to the eNB 11.

Here, the MTC UE may be divided into a plurality of cluster units.

Preferably, the eNB 11 is further configured to send RRC connection establishment information to the first UE in the cluster unit 12 after receiving RRC connection request information sent by the second UE in the cluster unit 12, and is further configured to receive RRC connection establishment completion information sent by the second UE in the cluster unit 12 so as to complete establishment of a network connection; and the cluster unit 12 is configured to send through the second UE the RRC connection request information to the eNB 11 so as to request for the establishment of the network connection, and is further configured to forward through the second UE the RRC connection establishment completion information sent by the first UE to the eNB 11 after receiving the RRC connection establishment information from the eNB 11.

Preferably, the eNB 11 is further configured to send an RAR signal to the first UE in the cluster unit 12 after receiving an RAP signal from the second UE in the cluster unit 12, and is further configured to send a competition parsing message to the first UE in the cluster unit 12 after receiving message signals of a DLL and an NL from the second UE in the cluster unit 12, so as to complete network access; and the cluster unit 12 is further configured to forward through the second UE the RAP signal sent by the first UE to the eNB 11, so as to request for the network access, and is further configured to forward through the second UE the message signals of the DLL and the NL sent by the first UE to the eNB 11.

Preferably, the eNB 11 is further configured to send sub-frame resource configuration information to the first UE and the second UE in the cluster unit 12 through the RRC connection establishment information, wherein the sub-frame resource configuration information includes sub-frame resource configuration information of a time domain and sub-frame resource configuration information of a frequency domain.

Here, the sub-frame resource configuration information of the time domain is sent to the second UE and the first UE in the cluster unit 12 by the eNB 11 directly through SubframeConfig signaling in the RRC connection establishment information;

the sub-frame resource configuration information of the frequency domain is sent to the second UE and the first UE in the cluster unit 12 by the eNB 11 through UCI in a PUCCH in an uplink direction, and is sent to the second UE and the first UE in the cluster unit 12 by the eNB 11 through DCI in a PDCCH in a downlink direction.

Preferably, the cluster unit 12 includes second UE 121 and first UE 122, wherein the second UE 121 is configured to forward, to the eNB 11, data information sent by the first UE 122;

the first UE 122 is configured to send the data information through a PUSCH to the second UE 121, and is further configured to receive DTG information sent by the eNB 11 so as to complete data information transmission.

Preferably, the second UE 121 is configured to forward to the eNB 11 RRC connection request information sent by the first UE 122, and is further configured to forward to the eNB 11 RRC connection establishment completion information sent by the first UE 122 so as to complete establishment of a network connection;

Correspondingly, the first UE 122 is further configured to send the RRC connection request information to the second UE 121 to request for the establishment of the network connection; and is further configured to send the RRC connection establishment completion information to the second UE 121 after receiving RRC connection establishment information sent by the eNB 11.

Preferably, the second UE 121 is further configured to forward to the eNB 11 an RAP signal sent by the first UE 122, and is further configured to forward to the eNB 11 message signals of a DLL and an NL from the first UE 122.

Correspondingly, the first UE 122 is configured to send the RAP signal to the second UE 121 to request for network access and receive an RAR signal sent by the eNB 11, and is further configured to send the message signals of the DLL and the NL to the second UE 121, and receive a competition parsing message sent by the eNB 11 so as to complete the network access.

Specifically, the eNB 11 broadcasts control signaling to release various information of an access network. After receiving the control signaling, first UE 122 sends an RAP signal. If second UE 121 receives the RAP signal, the second UE 121 forwards the RAP signal to the eNB 11. If there is no second UE 121 receiving the RAP signal, the first UE 122 sends the RAP signal to the eNB 11 directly. A process described herein and hereinafter for the first UE 122 to perform uplink communication directly with and the eNB 11 belong to the prior art, and will not be described repeatedly in the disclosure. After receiving the RAP signal forwarded by the second UE 121, the eNB 11 sends an RAR signal to the first UE 122. The first UE 122 sends message signals of a DLL and an NL to the second UE 121. The second UE 121 forwards the message signals of the DLL and the NL to the eNB 11. The eNB 11 sends a competition parsing message to the first UE 122 to complete network access.

The first UE 122 sends RRC connection request information. After receiving the RRC connection request information from the first UE 122, the second UE 121 forwards the information to the eNB 11. The eNB 11 sends RRC connection establishment information to the first UE 122, and the first UE 122 forwards RRC connection establishment completion message to the eNB 11 through the second UE 121 so as to complete the establishment of the network connection.

The first UE 122 forwards the data information to the eNB 11 through the second UE 121. After receiving the data information, the eNB 11 sends the DTG information to the first UE 122 so as to complete the data information transmission.

Here, the first UE is provided with a common function of an existing MTC UE. In terms of the design of a bottom layer, a radio frequency part, which adopts an LTE/LTE-A frequency band, is applicable to an LTE/LTE-A system, and a single transceiver antenna and a single radio frequency link are applied. In an aspect of protocols and progresses, protocols of a Media Access Control (MAC) layer and a Radio Link Control (RLC) layer, as well as a progress at a physical layer are simplified. In an aspect of baseband, a standard that MTC UE has the minimalist functions in an LTE/LTE-A system and a lower order Modulation Coding Scheme (MCS) are applied and a Hybrid Automatic Repeat Request (HARQ) progress is deleted, and so on, thus reducing a data rate, reducing transmission efficiency, lowering power consumption and reducing interference to users around.

The second UE, which is added with a relay function compared with existing MTC UE, also applies an LTE/LTE-A frequency band so that the second UE can forward uplink data of the first UE to the eNB.

Figure 2:
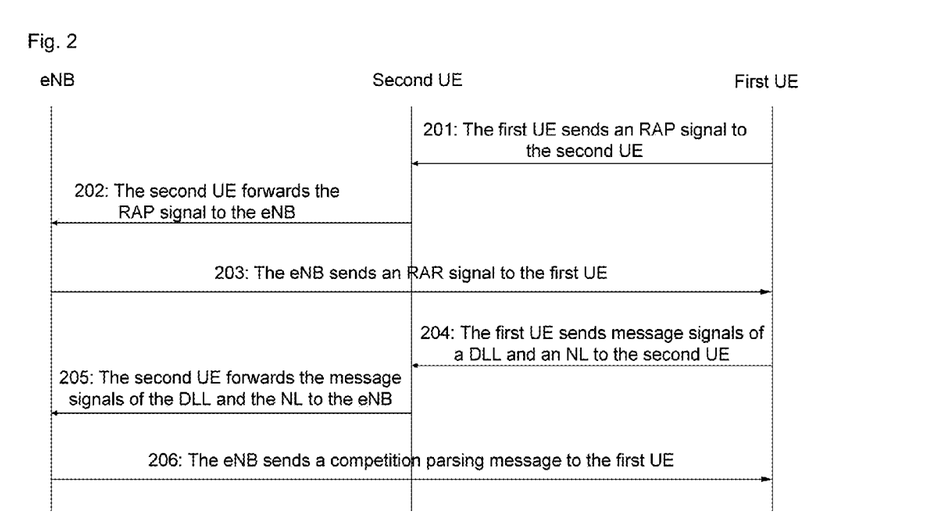
FIG. 2 is a flowchart of a network access method for MTC in LTE-A according to an embodiment of the disclosure.

FIG. 2 is a flowchart of a network access method for MTC in LTE-A according to an embodiment of the disclosure, including the following steps as shown in FIG. 2.

Step 201 to Step 203 include that first UE sends an RAP signal to second UE, the second UE forwards the RAP signal to an eNB, and the eNB sends an RAR signal to the first UE.

Here, before the first UE sends the RAP signal to the second UE, the method may further include that the eNB broadcasts control signaling to release various information of an access network to each UE in a range of an area.

Step 204 to Step 206 include that the first UE sends message signals of a DLL and an NL to the second UE. The second UE forwards the message signals of the DLL and the NL to the eNB. The eNB sends a competition parsing message to the first eNB to complete the network access.

Here, the message signals of the DLL and the NL are DLL and NL information related to network access, specifically including RRC connection request information, tracking area update information, and scheduling request information and so on.

Figure 3:
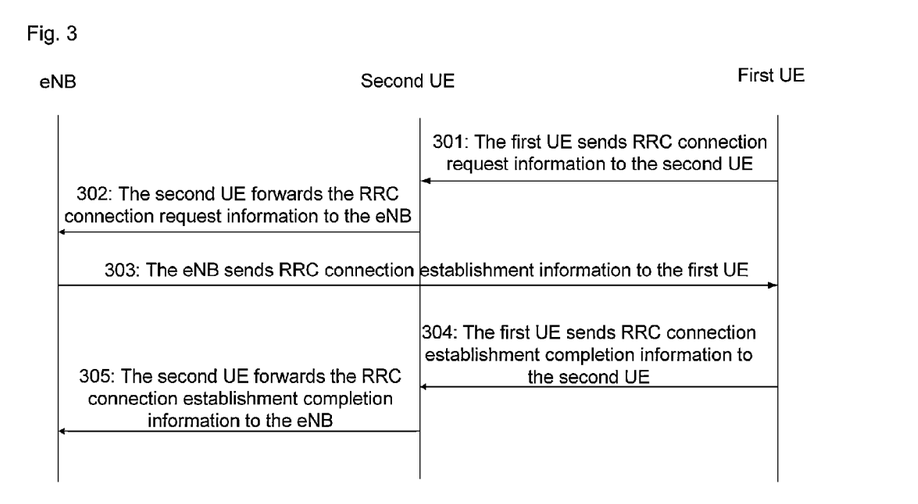
FIG. 3 is a flowchart of a method for establishing a network connection for MTC in LTE-A according to an embodiment of the disclosure.

FIG. 3 is a flowchart of a method for establishing a network connection for MTC in LTE-A according to an embodiment of the disclosure, including the following steps as shown in FIG. 3.

Step 301 to Step 302 include that first UE sends RRC connection request information to second UE, and the second UE forwards to an eNB the RRC connection request information after receiving the RRC connection request information from the first UE.

Here, the second UE may select a connection request of the first UE, e.g. a plurality of pieces of first UE may initiate connection requests to the second UE in a cluster unit, and the second UE may select connection requests in order according to delays, process the one having shortest delay firstly, and so on.

Step 303 includes that the eNB sends RRC connection establishment information to the first UE.

Here, the eNB may send sub-frame resource configuration information to the first UE through the RRC connection establishment information. The sub-frame resource configuration information includes sub-frame resource configuration information of a time domain and sub-frame resource configuration information of a frequency domain, wherein the sub-frame resource configuration information of the time domain is sent by the eNB to the second UE and the first UE in the cluster unit directly through Subframe-Config signaling in the RRC connection establishment information.

The sub-frame resource configuration information of the frequency domain is sent by the eNB to the second UE and the first UE in the cluster unit through UCI in a PUCCH in an uplink direction, and is sent to the second UE and the first UE in the cluster unit by the eNB through DCI in a PDCCH in a downlink direction.

Specifically, the eNB is responsible for sub-frame resource configuration for MTC, including three links in the technical solutions of the disclosure. In a downlink direction, the eNB sends sub-frame resource configuration to the first UE and the second UE. In an uplink direction, the first UE sends sub-frame resource configuration information to the second UE, and the second UE sends the sub-frame resource configuration information to the eNB, wherein the sub-frame resource configuration information sent by the second UE to the eNB in the downlink direction and the uplink direction belongs to the prior art, and will not be described repeatedly here. A sub-band or a sub-frame is separately allocated to a resource allocated among second UE by the first UE in the uplink direction, thus avoiding interference caused by communication between the first UE and the second UE on other users.

Specifically, there may be four cases of resource configuration in the system according to the embodiment of the disclosure, as shown in Table 1 to Table 4, wherein Table 1 is a frequency division resource allocation table in a Frequency Division Duplexing (FDD) system. Two independent channels are defined during an operation in the frequency division system, one of which is configured to transfer downlink information and the other one is configured to transfer uplink information, wherein F1 is a downlink frequency band, F2 is an uplink frequency band between second UE and an eNB, F3 is an MTC frequency band between first UE and the second UE, and the bandwidth of F2 is larger than that of F3.

TABLE 1

| F1 (downlink frequency band) | eNB→first UE/second UE |
| F2 (uplink frequency band) | Second UE→eNB |
| F3 (MTC frequency band) | First UE→second UE |

Table 2 is a time division resource configuration table in an FDD system. In the resource configuration, time slots T1 and T2 are defined in an uplink frequency band and a downlink frequency band, wherein the time slots T1 and T2 of the downlink frequency band F1 are downlink frequency bands. The time slot T1 of the uplink frequency band F2 is divided into MTC sub-frames between first UE and second UE, and the time slot T2 of the uplink frequency band F2 is divided into sub-frames between the second UE and an eNB.

TABLE 2

|  | T1 (MTC sub-frame) | T2 (LTE-A sub-frame) |
| --- | --- | --- |
| F1 (downlink frequency band) | eNB→first UE/second UE | |
| F2 (uplink frequency band) | First UE→second UE | Second UE→eNB |

Table 3 is a frequency division resource configuration table in a Time Division Duplexing (TDD) system. Uplink data and downlink data are in different time slots of channels of the same frequency during an operation of the time division system. In this way, a time slot T1 and a time slot T2 are defined in frequency bands F1 and F2 in resource configuration as shown in Table 3. In the frequency band F1, the time slot T1 is a downlink frequency band of the system, and the time slot T2 is an uplink frequency band between a second UE and an eNB. In the frequency band F2, the time slot T1 is also a downlink frequency band of the system, and the time slot T2 is an uplink sub-frame between a first UE and the second UE.

TABLE 3

| | T1 downlink Sub-frame | T2 uplink sub-frame |
|---|---|---|
| F1 | eNB→first UE/second UE | Second UE→eNB |
| F2 | | First UE→second UE |

Table 4 is a time division resource configuration table in a TDD system, wherein a frequency channel is divided into three time slots in the resource configuration, i.e. time slots T1, T2 and T3, wherein the time slot T1 is a downlink sub-frame of the system, the time slot T2 is an uplink sub-frame between second UE and an eNB and the time slot T3 is an MTC uplink sub-frame between first UE and the second UE.

TABLE 4

| T1 (downlink sub-frame) | T2 (uplink sub-frame) | T3 (MTC sub-frame) |
|---|---|---|
| eNB→first UE/second UE | Second UE→eNB | First UE→second UE |

Step 304 to Step 305 include that the first UE sends RRC connection establishment completion information to the second UE, and the second UE forwards the RRC connection establishment completion information to the eNB after receiving the RRC connection establishment completion information sent by the first UE.

Figure 4:
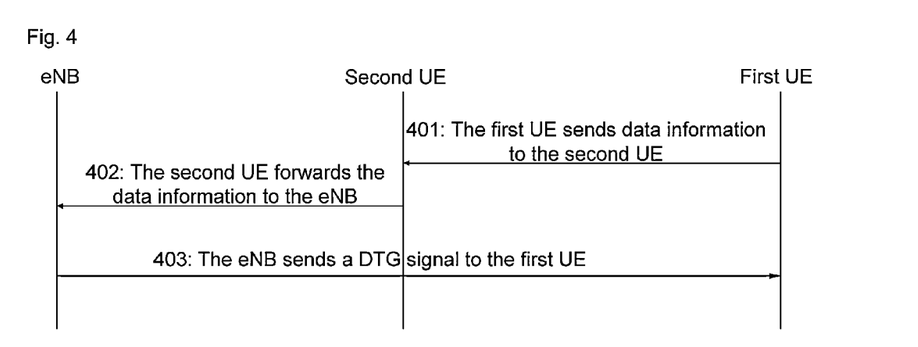
FIG. 4 is a flowchart of a method for data transmission for MTC in LTE-A according to an embodiment of the disclosure.

FIG. 4 is a flowchart of a method for data transmission for MTC in LTE-A according to an embodiment of the disclosure, including the following steps as shown in FIG. 4.

Step 401 to Step 402 include that first UE sends data information to second UE, and the second UE forwards the data information to an eNB after receiving the data information sent by the first UE.

Here, the first UE sends the data information to the second UE through a PUSCH, and the second UE forwards the data information to the eNB after receiving the data information sent by the first UE.

Step 403 includes that the eNB sends a DTG signal to the first UE to complete the data transmission.

Here, the DTG signal includes Positive Acknowledgement (PACK) and Negative Acknowledgement (NACK). When the first UE receives the PACK, it indicates that data has been received inerrably. When the first UE receives the NACK, it indicates that data has been received mistakenly, and data needs to be retransmitted, then the first UE performs Step 401 again to continue to transmit data information.

The foregoing descriptions are only preferred embodiments of the disclosure and are not used for limiting the protection scope of the disclosure. All modifications, equivalent replacements and improvements and the like made within the spirit and scope of the disclosure shall be included within the protection scope of the disclosure.

INDUSTRIAL APPLICABILITY

In the embodiments of the disclosure, pieces of MTC UE are divided into a plurality of cluster units, each of which includes one piece of second UE as a cluster head and at least one piece of first UE as cluster members; data information sent by the first UE to an eNB is forwarded by the second UE having a relay function, thus improving the utilization rate of resources when there are limited frequency spectrum resources and reducing the burden of a base station. In addition, the number of pieces of first UE is far larger than that of second UE in each cluster unit. In uplink transmission, a cluster member can have short-distance communication with a cluster head, which means that the range of the base station is extended to some degree. Besides, first UE, which is designed to have the minimalist functions of an existing MTC UE, has small transmission power, thus reducing interference to users around.

What is claimed is:

1. A method for Machine Type Communication (MTC) in Long Term Evolution Advanced (LTE-A), comprising: dividing pieces of MTC User Equipment (UE) into at least one cluster unit, each cluster unit comprising one piece of second UE serving as a cluster head and at least one, pieces of first UE serving as cluster members, wherein the number of the pieces of the first UE in the cluster unit is larger than the number of the pieces of the second UE in the cluster unit;

the first UE sends data information to the second UE through a Physical Uplink Shared Channel (PUSCH); after receiving the data information the second UE forwards the data information to an Evolved Node B (eNB); the eNB sends Data Transmission Grant (DTG) information to the first UE after receiving the data information to complete data information transmission;

before the first UE sends the data information to the second UE through the PUSCH, the method further comprising:

forwarding to the eNB, by the second UE, Radio Resource Control (RRC) connection request information sent by the first UE to request for establishment of a network connection, wherein the step of forwarding to the eNB, by the second UE, Radio Resource Control (RRC) connection request information sent by the first UE to request for establishment of a network connection comprises: when a plurality of pieces of the first UE in the cluster unit initiate the RRC connection request to the second UE in the cluster unit, the second UE in the cluster unit selects at least one RRC connection request according to delays of the RRC connection requests and forwards the selected at least one RRC connection request to the eNB;

sending, by the eNB, RRC connection establishment information to the first UE; and forwarding, by the first UE, RRC connection establishment completion information to the eNB through the second UE to complete the establishment of the network connection.

2. The method according to claim 1, before forwarding to the eNB, by the second UE, the RRC connection request information sent by the first UE to request for the establishment of the network connection, the method further comprising:

forwarding to the eNB, by the second UE, a Random Access Preamble (RAP) signal sent by the first UE, so as to request for network access;

sending, by the eNB, a Random Access Response (RAR) signal to the first UE;

forwarding to the eNB, by the second UE, message signals of a Data Link Layer (DLL) and a Network Layer (NL) from the first UE; and sending, by the eNB, a competition parsing message to the first UE to complete the network access.

3. The method according to claim 1, further comprising: sending, by the eNB, sub-frame resource configuration information to the second UE and the first UE through the RRC connection establishment information, wherein the sub-frame resource configuration information comprises sub-frame resource configuration information of a time domain and sub-frame resource configuration information of a frequency domain.

4. The method according to claim 3, further comprising:
sending, by the eNB, the sub-frame resource configuration information of the time domain to the second UE and the first UE directly through SubframeConfig signaling in the RRC connection establishment information;
sending, by the eNB, the sub-frame resource configuration information of the frequency domain to the second UE and the first UE through Uplink Control Information (UCI) in a Physical Uplink Control Channel (PUCCH) in an uplink direction, and through Downlink Control Information (DCI) in a Physical Downlink Control Channel (PDCCH) in a downlink direction.

5. The method according to claim 3, wherein the sub-frame resource configuration information of a frequency domain includes information of F1, F2 and F3;
the F1 is a downlink frequency band;
the F2 is an uplink frequency band between the second UE in the cluster unit and the eNB;
the F3 is an MTC frequency band between the first UE in the cluster unit and the second UE in the cluster unit, and
a bandwidth of the F2 is larger than a bandwidth of the F3.

6. A cluster unit for Machine Type Communication (MTC) in Long Term Evolution Advanced (LTE-A), comprising one piece of second User Equipment (UE) serving as a cluster head and at least one piece of first UE serving as cluster members, wherein
the number of the pieces of the first UE in the cluster unit is larger than the number of the pieces of the second UE in the cluster unit;
the second UE is configured to forward to an Evolved Node B (eNB) data information sent by the first UE;
the first UE is configured to send the data information to the second UE through a Physical Uplink Shared Channel (PUSCH), and is further configured to receive Data Transmission Grant (DTG) information sent by the eNB to complete data information transmission, and
before the first UE sends the data information to the second UE through the PUSCH, the second UE is further configured to forward to the eNB Radio Resource Control (RRC) connection request information sent by the first UE, and is further configured to forward to the eNB RRC connection establishment completion information sent by the first UE to complete establishment of a network connection, wherein the forwarding to the eNB RRC connection establishment completion information comprises: when a plurality of pieces of the first UE initiate RRC connection request to the second UE in the cluster unit, the second UE in the cluster unit is configured to select at least one RRC connection request according to delays of the RRC connection requests and forward the selected at least one RRC connection request to the eNB, and
the first UE is further configured to send the RRC connection request information to the second UE to request for the establishment of the network connection, and is further configured to send the RRC connection establishment completion information to the second UE after receiving RRC connection establishment information sent by the eNB.

7. The cluster unit according to claim 6, wherein
the second UE is configured to forward to the eNB a Random Access Preamble (RAP) signal sent by the first UE, and is further configured to forward to the eNB message signals of a Data Link Layer (DLL) and a Network Layer (NL) from the first UE; and
the first UE is configured to send the RAP signal to the second UE to request for network access and receive a Random Access Response (RAR) signal from the eNB, and is further configured to send the message signals of the DLL and the NL to the second UE, and receive a competition parsing message from the eNB so as to complete the network access.

8. The cluster unit according to claim 6, wherein
the first UE and the second UE are further configured to receive sub-frame resource configuration information through the RRC connection establishment information, and wherein the sub-frame resource configuration information comprises sub-frame resource configuration information of a time domain, and
wherein the sub-frame resource configuration information of a frequency domain includes information of F1, F2 and F3; the F1 is a downlink frequency band; the F2 is an uplink frequency band between the second UE in the cluster unit and the eNB; the F3 is an MTC frequency band between the first UE in the cluster unit and the second UE in the cluster unit, and a bandwidth of the F2 is larger than a bandwidth of the F3.

9. A system for Machine Type Communication (MTC) in Long Term Evolution Advanced (LTE-A), comprising an Evolved Node B (eNB) and at least one cluster unit; each cluster unit comprises one piece of second User Equipment (UE) serving as a cluster head and at least one piece of first UE serving as cluster members, wherein
the eNB is configured to send Data Transmission Grant (DTG) information to the first UE after receiving data information from the second UE in the cluster unit, to complete data information transmission;
the cluster unit is configured to forward the data information sent by the first UE to the eNB through the second UE;
the eNB is configured to send Radio Resource Control (RRC) connection establishment information to the first UE in the cluster unit after receiving RRC connection request information from the second UE in the cluster unit, and is further configured to receive RRC connection establishment completion information from the second UE in the cluster unit to complete establishment of a network connection; and
the cluster unit is configured to send through the second UE the RRC connection request information to the eNB to request for the establishment of the network connection, and is further configured to forward through the second UE the RRC connection establishment completion information sent by the first UE to the eNB after receiving the RRC connection establishment information from the eNB, and
wherein the number of the pieces of the first UE in the cluster unit is larger than the number of the pieces of the second UE in the cluster unit, and when a plurality of pieces of the first UE in the cluster unit initiate the RRC connection request to the second UE in the cluster unit, the second UE in the cluster unit selects at least one RRC connection request according to delays of the RRC connection requests and forwards the selected at least one RRC connection request to the eNB.

10. The system according to claim 9, wherein
the eNB is further configured to send an Random Access Response (RAR) signal to the first UE in the cluster unit after receiving a Random Access Preamble (RAP) signal from the second UE in the cluster unit, and is further configured to send a competition parsing message to the first UE in the cluster unit after receiving message signals of a Data Link Layer (DLL) and a Network Layer (NL) from the second UE in the cluster unit, to complete network access; and
the cluster unit is further configured to forward through the second UE the RAP signal sent by the first UE to the eNB, so as to request for the network access, and is further configured to forward to the eNB through the second UE the message signals of the DLL and the NL sent by the first UE.

11. The system according to claim 10, wherein the eNB is further configured to send sub-frame resource configuration information to the cluster unit through the RRC connection establishment information, wherein the sub-frame resource configuration information comprises sub-frame resource configuration of a time domain and sub-frame resource configuration information of a frequency domain.

12. The system according to claim 11, wherein
the sub-frame resource configuration information of the time domain is sent to the second UE and the first UE in the cluster unit by the eNB directly through SubframeConfig signaling in the RRC connection establishment information; and
the sub-frame resource configuration information of the frequency domain is sent to the second UE and the first UE in the cluster unit by the eNB through Uplink Control Information (UCI) in a Physical Uplink Control Channel (PUCCH) in an uplink direction, and is sent to the second UE and the first UE in the cluster unit by the eNB through Downlink Control Information (DCI) in a Physical Downlink Control Channel (PDCCH) in a downlink direction.

13. The system according to claim 11, the sub-frame resource configuration information of a frequency domain includes information of F1, F2 and F3;
the F1 is a downlink frequency band;
the F2 is an uplink frequency band between the second UE in the cluster unit and the eNB;
the F3 is an MTC frequency band between the first UE in the cluster unit and the second UE in the cluster unit, and
a bandwidth of the F2 is larger than a bandwidth of the F3.

14. The system according to claim 10, wherein
the second UE is configured to forward to the eNB the data information sent by the first UE; and
the first UE is configured to send the data information to the second UE through a Physical Uplink Shared Channel (PUSCH), and is further configured to receive the DTG information from the eNB to complete the data information transmission.

15. The system according to claim 14, wherein
the second UE is configured to forward to the eNB the RRC connection request information sent by the first UE, and is further configured to forward to the eNB the RRC connection establishment completion information sent by the first UE to complete the establishment of the network connection; and
the first UE is configured to send the RRC connection request information to the second UE to request for the establishment of the network connection, and is further configured to send the RRC connection establishment completion information to the second UE after receiving the RRC connection establishment information from the eNB.

16. The system according to claim 9, wherein
the second UE is configured to forward to the eNB the data information sent by the first UE; and
the first UE is configured to send the data information to the second UE through a Physical Uplink Shared Channel (PUSCH), and is further configured to receive the DTG information from the eNB to complete the data information transmission.

17. The system according to claim 16, wherein
the second UE is configured to forward to the eNB the RAP signal sent by the first UE, and is further configured to forward to the eNB the message signals of the DLL and the NL from the first UE;
the first UE is configured to send the RAP signal to the second UE to request for the network access and receive the RAR signal from the eNB, and is further configured to send to the second UE the message signals of the DLL and NL sent by the second UE and receive the competition parsing message from the eNB to complete the network access.

18. The system according to claim 9, wherein
the second UE is configured to forward to the eNB the data information sent by the first UE; and
the first UE is configured to send the data information to the second UE through a Physical Uplink Shared Channel (PUSCH), and is further configured to receive the DTG information from the eNB to complete the data information transmission.

19. The system according to claim 18, wherein
the second UE is configured to forward to the eNB the RRC connection request information sent by the first UE, and is further configured to forward to the eNB the RRC connection establishment completion information sent by the first UE to complete the establishment of the network connection; and
the first UE is configured to send the RRC connection request information to the second UE to request for the establishment of the network connection, and is further configured to send the RRC connection establishment completion information to the second UE after receiving the RRC connection establishment information from the eNB.

* * * * *